United States Patent
Mohamed et al.

(10) Patent No.: US 12,335,308 B1
(45) Date of Patent: Jun. 17, 2025

(54) SYSTEM AND METHOD FOR MODELLING A CYBER-PHYSICAL SYSTEM TO ACT AS A HONEYPOT FOR CYBERATTACKS

(71) Applicant: THE GOVERNING COUNCIL OF THE UNIVERSITY OF TORONTO, Toronto (CA)

(72) Inventors: Amr Mohamed Saber Mohamed, Kingston (CA); Deepa Kundur, Oakville (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 18/795,878

(22) Filed: Aug. 6, 2024

(51) Int. Cl.
*H04L 9/40* (2022.01)

(52) U.S. Cl.
CPC ...... *H04L 63/1491* (2013.01); *H04L 63/1441* (2013.01)

(58) Field of Classification Search
CPC .... H04L 63/1491; H04L 9/40; H04L 63/1441
See application file for complete search history.

(56) References Cited

U.S. PATENT DOCUMENTS

| | | | | |
|---|---|---|---|---|
| 11,381,582 | B1* | 7/2022 | Mohammed | G06F 30/31 |
| 2018/0159890 | A1* | 6/2018 | Warnick | H04L 63/1433 |
| 2020/0076850 | A1* | 3/2020 | Edgar | H04L 63/1416 |
| 2021/0209233 | A1* | 7/2021 | Rieger | H04L 63/1433 |
| 2021/0243226 | A1* | 8/2021 | El Gamal | H04L 63/1416 |
| 2024/0241494 | A1* | 7/2024 | Schenk | C23C 2/06 |

FOREIGN PATENT DOCUMENTS

| | | | | |
|---|---|---|---|---|
| CA | 3001463 | A1 * | 7/2017 | H04L 63/1433 |
| CA | 3224095 | A1 * | 12/2022 | H04L 63/10 |
| CN | 106302535 | A | 1/2017 | |
| CN | 106911514 | A | 6/2017 | |

(Continued)

OTHER PUBLICATIONS

"IEEE standard for interconnection and interoperability of distributed energy resources with associated electric power systems interfaces", IEEE Std 1547-2018 (Revision of IEEE Std 1547-2003)—Redline, pp. 1-227, Apr. 2018.

(Continued)

*Primary Examiner* — Jayesh M Jhaveri
(74) *Attorney, Agent, or Firm* — Bhole IP Law; Marc Lampert

(57) ABSTRACT

A system and method for modelling a cyber-physical system to act as a honeypot for cyberattacks. The method including: building a virtual instance of the cyber-physical system including a physical layer and a cyber layer that controls the physical layer; generating a safety set defined by control barrier functions, the safety set delineates the bounds within which the cyber-physical system can operate safely; receiving a cyberattack payload from an attacking device; simulating physical dynamics of the physical layer and operation of the cyber layer; projecting whether the cyberattack payload can force the cyber-physical system to exit the safety set based on the simulated physical dynamics; and performing a safety action on the cyber-physical system when the physical system is projected to exit the safety set due to the cyberattack payload.

14 Claims, 10 Drawing Sheets

(56) References Cited

FOREIGN PATENT DOCUMENTS

| | | | | |
|---|---|---|---|---|
| CN | 108319161 A | | 7/2018 | |
| CN | 109167796 A | | 1/2019 | |
| CN | 118590309 A | * | 9/2024 | |
| WO | 2018068040 A1 | | 4/2018 | |
| WO | WO-2023084279 A1 | * | 5/2023 | ......... G05B 19/0428 |

OTHER PUBLICATIONS

"The cyber threat to Canada's electricity sector. Government of Canada", Canadian Center for Cyber Security, Nov. 2020.

"The honeynet project", [Online]. Available: https://www.honeynet.org/https://www.honeynet.org/.

Ames, Aaron D., et al., "Control barrier function based quadratic programs for safety critical systems", IEEE Transactions on Automatic Control, vol. 62, No. 8, pp. 3861-3876, 2016.

Buza, Daniel Istvan, et al., "CryPLH: Protecting Smart Energy Systems from Targeted Attacks with a PLC Honeypot", in Smart Grid Security: Second International Workshop SmartGridSec 2014, Munich, Germany, Feb. 26, 2014, Revised Selected Papers 2. Springer, 2014, pp. 181-192.

Conti, Mauro, et al., "Icspot: A high-interaction honeypo for industrial control systems", in 2022 International Symposium on Networks, Computers and Communications (ISNCC). IEEE, 2022.

Cruz, T, et al., "A cybersecurity detection framework for supervisory control and data acquisition systems", IEEE Transactions on Industrial Informatics, vol. 12, No. 6, pp. 2236-2246, 2016.

Dutta, Nitul, et al., "Using honeypots for ics threats evaluation", Recent developments on industrial control system. resilience, pp. 175-196, 2020.

Franco, Javier, et al., "A survey of honeypots and honeynets for internet of things, industrial internet of things, and cyber-physical systems", IEEE Communications Surveys & Tutorials, vol. 23, No. 4, pp. 2351-2383, 2021.

Hyun, Dahae, "Collecting cyberattack data for industrial control systems using honeypots", Ph.D. dissertation, Monterey, California: Naval Postgraduate School, 2018.

Kirishikesan, K., et al., "A high-interaction physics-aware ics honeypot for industrial environments", The International Journal on Advances in ICT for Emerging Regions, vol. 16, No. 2, 2023.

Koltys, Kamil, et al., "Shape: A honeypot for electric power substation", Journal of telecommunications and information technology, No. 4, pp. 37-43, 2015.

Kundur, Deepa, "Hackers will use AI to orchestrate worldwide cyberattacks", Maclean's, pp. 54-55, Nov. 2023.

Langner, Ralph, "To kill a centrifuge: A technical analysis of what stuxnet's creators tried to achieve", The Langner Group, Nov. 2012.

Litchfield, Samuel, et al., "Rethinking the honeypot for cyber-physical systems", IEEE Internet Computing, vol. 20, No. 5, pp. 9-17, 2016.

Mashima, Daisuke, et al., "Towards a grid-wide, high-fidelity electrical substation honeynet", in 2017 IEEE International Conference on Smart Grid Communications (SmartGridComm). IEEE, 2017, pp. 89-95.

Mohamed, Amr S., et al., "On the use of reinforcement learning for attacking and defending load frequency control", IEEE Transactions on Smart Grid, pp. 1-16, 2023.

Morales, EFRéN LóPEZ, et al., "Honeyplc: A next-generation honeypot for industrial control systems", in Proceedings of the 2020 ACM SIGSAC Conference on Computer and Communications Security, 2020, pp. 279-291.

Pliatsios, Dimitrios, et al., "A novel and interactive industrial control system honeypot for critical smart grid infrastructure", in 2019 IEEE 24th International Workshop on Computer Aided Modeling and Design of Communication Links and Networks (CAMAD). IEEE, 2019, pp. 1-6.

Redwood, Owen, et al., "A symbolic honeynet framework for scada system threat intelligence", in Critical Infrastruc ture Protection IX: 9th IFIP 11.10 International Conference, ICCIP 2015, Arlington, VA, USA, Mar. 16-18, 2015, Revised Selected Papers 9. Springer, 2015, pp. 103-118.

Scott, Charles, et al., "Designing and implementing a honeypot for a scada network", SANS Institute Reading Room, vol. 39, 2014.

Shan, Yao, et al., "Neupot: A neural network based honeypot for detecting cyber threats in industrial control systems", IEEE Transactions on Industrial Informatics, 2023.

Skinner, B. F., et al., "Science and human behavior", Simon and Schuster, 1965, No. 92904.

Weber, James, "Description of machine models: GENROU, GENSAL, GENTPF and GENTPJ", Oct. 2015. [Online]. Available: https://www.powerworld.com/files/GENROU-GENSAL-GENTPF-GENTPJ.pdf.

Zhang, Thomas, "Honeypot-factory: The use of deception in ics/ot environments", Feb. 2023. [Online]. Available: https://thehackernewshttps://thehackernews.com/2023/02/honeypot-factory-use-of-deception-in.html.

International Search Report for PCT application No. PCT/CN2019/101244, China National Intellectual Property Administration, search completed: Oct. 21, 2019, mailed: Nov. 19, 2019.

Written Opinion of the International Searching Authority for PCT application No. PCT/CN2019/101244, China National Intellectual Property Administration, opinion completed: Nov. 13, 2019, mailed: Nov. 19, 2019.

Antonioli, Daniele, et al., "Towards high-interaction virtual ICS honeypots-in-a-box", CPS-SPC '16: Proceedings of the 2nd ACM Workshop on Cyber-Physical Systems Security and Privacy, pp. 13-22, https://doi.org/10.1145/2994487.2994493.

Bernieri, Giuseppe, et al., "MimePot: a model-based honeypot for industrial control networks", In 2019 IEEE international conference on systems, man and cybernetics (smc) (pp. 433-438). IEEE.

Hilt, Stephen, et al., "Caught in the act: Running a realistic factory honeypot to capture real threats", Trend Micro Research, (2020).

López-Morales, EFRéN, et al., "Honeyplc: A next-generation honeypot for industrial control systems", CCS '20: Proceedings of the 2020 ACM SIGSAC Conference on Computer and Communications Security, pp. 279-291, https://doi.org/10.1145/3372297.34233.

Lucchese, Marco, et al., "HoneyICS: A high-interaction physics-aware honeynet for industrial control systems", ARES '23: Proceedings of the 18th International Conference on Availability, Reliability and Security Article No. 113, pp. 1-10, https://doi.org/10.1145/3600160.36049.

Murillo, ANDRéS FELIPE, et al., "A virtual environment for industrial control systems: A nonlinear use-case in attack detection, identification, and response", ICSS '18: Proceedings of the 4th Annual Industrial Control System Security Workshop, pp. 25-32, https://doi.org/10.1145/3295453.3295457.

Navarro, Óscar, et al., "Gathering Intelligence Through Realistic Industrial Control System Honeypots: A Real-World Industrial Experience Report", In Critical Information Infrastructures Security: 13th International Conference, CRITIS 2018, Kaunas, Lithuania, Sep. 24-26, 2018, (2019), Revised Selected Papers 13 (pp. 143-153). Springer International Publishingb.

* cited by examiner

SYSTEM AND METHOD FOR MODELLING A CYBER-PHYSICAL SYSTEM TO ACT AS A HONEYPOT FOR CYBERATTACKS

TECHNICAL FIELD

The following relates generally to cybersecurity; and more specifically, to a system and method for modelling a cyber-physical system to act as a honeypot for cyberattacks.

BACKGROUND

The threat landscape against critical infrastructure is rapidly evolving with the active participation of sophisticated cyber criminals, including nation states and organized crime groups, with ample resources and knowledge. Such actors are capable of tailoring their cyberattacks to the specific vulnerabilities of the critical infrastructure, with cyberattacks demonstrating high stealthiness, damaging impact, and detrimental consequences. A notable example is Stuxnet, in which cyberattackers infiltrated the industrial control system of a nuclear centrifuge plant and extensively interacted with the physical process through both passive monitoring and active probing techniques, enabling them to execute a highly sophisticated, polymorphic cyberattack. Consequently, proactively acquiring knowledge of real cyberattackers and their strategies and capabilities is necessary to devise effective defenses in an evolving threat landscape.

SUMMARY

In an aspect of the present invention, there is provided a method for modelling a cyber-physical system to act as a honeypot for cyberattacks, the method executed on one or more processing units in communication with a data storage, the method comprising: building a virtual instance of the cyber-physical system comprising a physical layer and a cyber layer that controls the physical layer; generating a safety set defined by control barrier functions, the safety set delineates the bounds within which the cyber-physical system can operate safely; receiving a cyberattack payload from an attacking device; simulating physical dynamics of the physical layer and operation of the cyber layer; projecting whether the cyberattack payload can force the cyber-physical system to exit the safety set based on the simulated physical dynamics; and performing a safety action on the cyber-physical system when the physical system is projected to exit the safety set due to the cyberattack payload.

In a particular case of the method, the attack payload is permitted to affect the cyber layer and alter the physical dynamics of the cyber-physical system while the cyber-physical system is projected to remain within the safety set.

In another case of the method, the safety action comprises a modification to the cyber-physical system that minimally modifies the cyber-physical system or the cyberattack payload to maintain that the cyber-physical system is projected to stay within the safety set.

In yet another case of the method, the safety action ceases when the attack payload is projected to not cause the cyber-physical system to exit the safety set.

In yet another case of the method, the cyber layer of the cyber-physical system comprises devices that comprise one or more of network devices, control units, sensors, and intelligent electronic devices.

In yet another case of the method, the intelligent electronic devices comprise virtual intelligent electronic devices.

In yet another case of the method, the intelligent electronic devices comprise a mix of the virtual intelligent electronic devices and physical intelligent electronic devices.

In yet another case of the method, the physical layer comprises a system model of the cyber-physical system, inputs to the model comprising effects of the devices of the cyber layer devices on the physical dynamics of the physical later, and outputs of the model comprise measurements of the physical dynamics received by the devices of the cyber layer devices.

In yet another case of the method, determining whether the cyberattack payload is projected to force the cyber-physical system to exit the safety set comprises determining whether deviations in the measurements of the physical dynamics would trigger protective devices of the cyber-physical system.

In yet another case of the method, determining whether the cyberattack payload is projected to force the cyber-physical system to exit the safety set comprises determining whether the cyberattack payload can force the cyber-physical system to exit the safety set a predetermined amount of time into the future.

In another aspect, there is provided a system for modelling a cyber-physical system to act as a honeypot for cyberattacks, the system comprising one or more processors in communication with a data storage, the data storage comprising instructions for the one or more processors to execute: a device module to build a virtual instance of the cyber-physical system comprising a physical layer and a cyber layer that controls the physical layer, and to generate a safety set defined by control barrier functions, the safety set delineates the bounds within which the cyber-physical system can operate safely; a simulation module to receive a cyberattack payload from an attacking device, and to simulate physical dynamics of the physical layer and operation of the cyber layer; and a control module to project whether the cyberattack payload can force the cyber-physical system to exit the safety set based on the simulated physical dynamics, and to perform a safety action on the cyber-physical system when the physical system is projected to exit the safety set due to the cyberattack payload.

In a particular case of the system, the attack payload is permitted to affect the cyber layer and alter the physical dynamics of the cyber-physical system while the cyber-physical system is projected to remain within the safety set.

In another case of the system, the safety action comprises a modification to the cyber-physical system that minimally modifies the cyber-physical system or the cyberattack payload to maintain that the cyber-physical system is projected to stay within the safety set.

In yet another case of the system, the safety action ceases when the attack payload is projected to not cause the cyber-physical system to exit the safety set.

In yet another case of the system, the cyber layer of the cyber-physical system comprises devices that comprise one or more of network devices, control units, sensors, and intelligent electronic devices.

In yet another case of the system, the intelligent electronic devices comprise virtual intelligent electronic devices.

In yet another case of the system, the intelligent electronic devices comprise a mix of the virtual intelligent electronic devices and physical intelligent electronic devices.

In yet another case of the system, the physical layer comprises a system model of the cyber-physical system, inputs to the model comprising effects of the devices of the cyber layer devices on the physical dynamics of the physical later, and outputs of the model comprise measurements of the physical dynamics received by the devices of the cyber layer devices.

In yet another case of the system, determining whether the cyberattack payload is projected to force the cyber-physical system to exit the safety set comprises determining whether deviations in the measurements of the physical dynamics would trigger protective devices of the cyber-physical system.

In yet another case of the system, determining whether the cyberattack payload is projected to force the cyber-physical system to exit the safety set comprises determining whether the cyberattack payload can force the cyber-physical system to exit the safety set a predetermined amount of time into the future.

These and other aspects are contemplated and described herein. It will be appreciated that the foregoing summary sets out representative aspects of embodiments to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
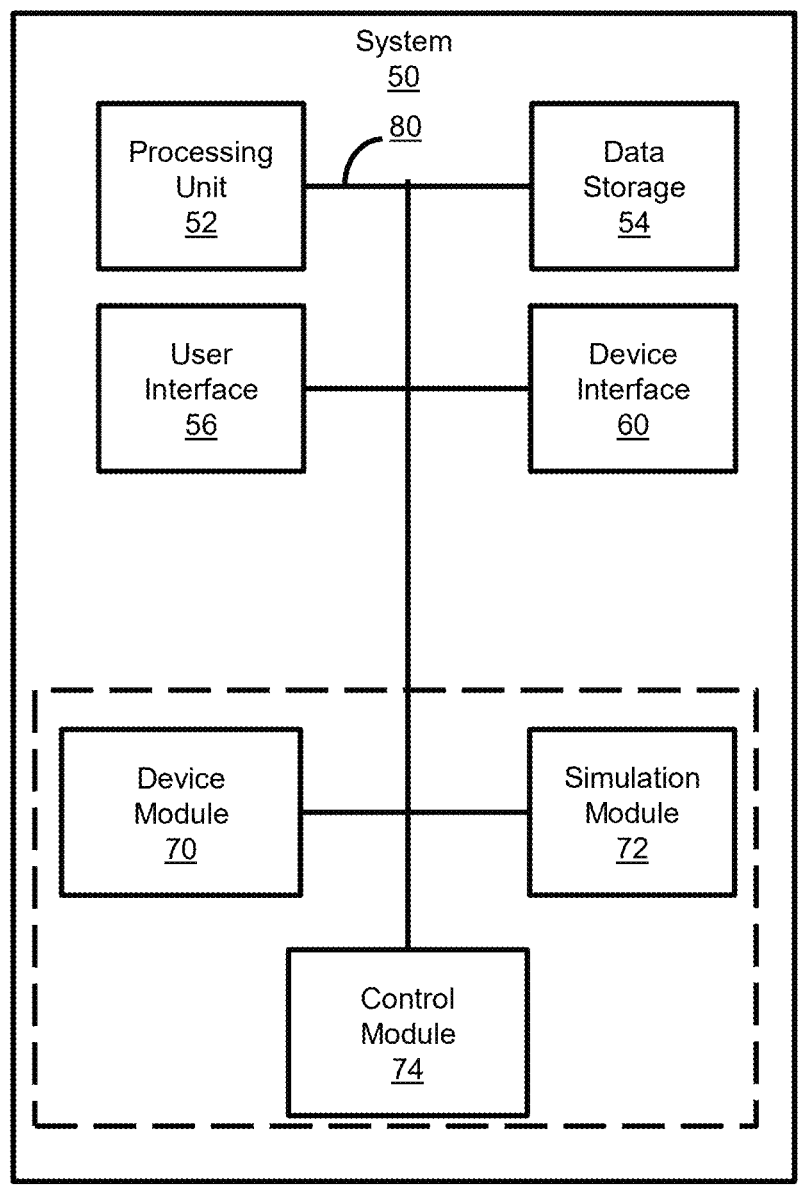
FIG. 1 shows a schematic diagram of a system for physical layer modelling with a safety set in a cyber-physical system honeypot, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to cybersecurity; and more specifically, to a system and method for modelling a cyber-physical system to act as a honeypot for cyberattacks.

Understanding attacker strategies is increasingly vital for proactive cyber-physical defense amidst evolving cyber threats targeting, for example, electric grids. Cyber-physical system (CPS) honeypots offer a potent tool to engage and accumulate information from real cyberattackers. The present embodiments provide a CPS honeypot framework using safety critical control to adaptively resist attackers, extending their engagement, and eliciting deeper insights and information into their behaviours. The present embodiments implement a rich physical model in a CPS honeypot; which, as described herein, is validated via synthetic intelligent attacks.

In the field of Information Technology (IT) cybersecurity, honeypots are used to garner information about the behavior of cyberattackers and used to devise strategies to counter evolving cyber threats. Honeypots are decoys that are designed to deceive cyberattackers into revealing their tactics. Meanwhile, the defending system monitors the attackers' behavior, collecting traces for attacker profiling, recording attack logs to guide defenses, and collecting attack statistics to trace and quantify cyberattack attempts. The convergence of IT and Operational Technology (OT) in CPS and industrial control systems (ICS) has increased the susceptibility of these systems to cyberattacks. Further, their growing importance to society makes these systems lucrative targets. Consequently, the deployment of honeypots to garner data about the threat landscape of CPS is a necessary and of great importance.

Cyber-physical attacks differ from conventional cyberattacks, demanding a broader and unique approach to honeypot implementation. Understanding cyber-physical attacks requires considering how attackers manipulate the IT layer of the CPS to install malware or compromise traffic, the control system layer to compromise process control, and ultimately the physical layer where damage occurs. In this way, there is considerable value in both emulating ICS networks and simulating the physical process in CPS honeypots to deceive and prolong engagement with sophisticated cyberattackers, acquiring data with deeper insights into their tactics and strategies.

CPS honeypots generally span a spectrum ranging from low to high interaction honeypots. Low interaction honeypot models emulate limited services on ICS devices to attract attackers. These low interaction honeypots are simple to deploy and maintain, making them valuable for early detection and basic data collection on attackers' activities, such as scanning attempts. However, due to their limited functionality and failure to simulate grid dynamics, they offer little insight into attackers' tactics or procedures and can be easily recognized by attackers. Deploying these types of honeypots generally reveal numerous scanning, pinging, and SSH login attempts, with attackers frequently targeting services like HTTP, Modbus, and other protocols.

High interaction honeypots aim to deceive attackers by providing a richer and more realistic interaction, enticing them to reveal their attack strategies. For example, using real devices alongside virtual devices in a honeypot, sharing the traffic of actual devices with attackers. To simulate physical behavior, simulators can be used to mimic physical power system devices, such as circuit breakers and substation equipment. In an example, a time-series forecast model can be used to replicate ICS physical processes when interacting with attackers. In another example, an ICS plant simulator can be used to emulate physical processes.

Advantageously, the present embodiments implement honeypot resilience to sophisticated attackers. Honeypot resilience is particularly advantageous for prolonging attacker engagement by resisting their attacks, maintaining the integrity of the physical process simulation within the CPS honeypot, and persuading attackers to refine their attacks. Failure to maintain this integrity can raise two issues: first, the honeypot may reveal sensitive physical vulnerabilities, becoming a tool for attackers to learn about strategies for attacking real systems. Secondly, attackers will likely cease beneficial interaction upon breaching integrity, limiting the honeypots' utility for studying advanced attacker strategies. To overcome these challenges, the present embodiments provide approaches that incorporate resilience to conceal vulnerabilities, compelling attackers to prolong engagement and introduce refined attacks, while acquiring data representing their behaviour for defense analysis.

The present embodiments integrate physical layer models into a CPS honeypot to provide realism in the honeypot for the purpose of deception and to persistently resist cyberattacks. In some cases, safety critical control (SCC) provides an approach to moderate the interaction between cyberattackers and the CPS honeypot. The SCC resists cyberattackers, compelling them to continually refine and adapt their attack strategies. In this way, the present embodiments provide a rich realistic model of a CPS in the honeypots to lure attackers to reveal informative attack signatures. Control barrier functions can be used to establish safety thresholds that attackers would seek to violate to destabilize, for example, a power grid. In some cases, to further engage the attacker, the SCC can be used to counteract the attacks, maintaining the integrity of the physical layer model.

In an example, the present inventors used a reinforcement learning (RL) agent-based synthesis of attacks for evaluation of the present embodiments in order to simulate the interactions between a sophisticated attacker and the honeypot equipped with SCC. This agent was tasked with generating synthetic attack scenarios, enabling evaluation of defensive capabilities of the SCC against intelligent and adaptive assaults.

Advantageously, the present embodiments incorporate a module into CPS honeypots that simulates resilient physical dynamics. This module allows attackers to probe the physical system, inject attacks, and receive realistic responses based on the system's physical dynamics, all while preserving the integrity of the subject system. This approach facilitates a rich engagement that enables observing the various stages of sophisticated attacks against ICS, (e.g., gathering data of the physical vulnerabilities), offering deeper insights beyond simple attempts to ping devices, scan networks, or trip breakers.

Referring now to FIG. 1, a system 50 for physical layer modelling with a safety set in a cyber-physical system honeypot, in accordance with an embodiment, is shown. The system 50 can be run on any suitable computing device, for example, on a general-purpose computing device, on a purpose-built controller, on cloud-hosted servers, or the like. In some embodiments, the components of the system 50 are stored by and executed on a single computer system or controller. In other embodiments, the components of the system 50 are distributed among two or more computer systems or controllers that may be locally or remotely distributed.

FIG. 1 shows various physical and logical components of an embodiment of the system 50. As shown, the system 50 has a number of physical and logical components, including a processing unit 52, a data storage 54, a user interface 56, a device interface 60 and a local bus 80 enabling the processing unit 52 to communicate with the other components. The processing unit 102 executes various modules, as described herein in greater detail. The data storage 54 provides responsive data storage to the processing unit 52, including computer-executable instructions for implementing the modules, as well as any data used by these services. The user interface 106 enables an administrator or user to provide input via an input device, for example a keyboard and mouse. The user interface 106 can also output information to output devices to the user, such as a display and/or speakers. The device interface 110 permits communication with various equipment and systems; for example, the various physical equipment in the CPS.

In an embodiment, the processing unit 52 can execute a number of conceptual modules, which can include a device module 70, a simulation module 72, and a control module 74. In some cases, the functions and/or operations of the conceptual modules can be combined or executed on other modules.

In a particular case, the system 50 can be used to ensure the safety of the CPS by imposing minimal modifications to its existing control strategy. Safety is defined by a safe set S, within which the CPS is considered safe. The safe set is represented as a super-level set of a continuously differentiable function h: $R^n \rightarrow R$ $$S = \{x \in \mathbb{R}^n : h(x) \geq 0\}$$

$$\partial S = \{x \in \mathbb{R}^n : h(x) = 0\}$$

$$\text{Int}(S) = \{x \in \mathbb{R}^n : h(x) > 0\} \quad (1)$$

This enables the construction of a logarithmic barrier function:

$$B(x) = -\log\left(\frac{h(x)}{1 + h(x)}\right) \quad (2)$$

with the following two properties:

$$\inf_{x \in S} B(x) > 0 \quad (3)$$

$$\lim_{x \to \partial S} B(x) = \infty \quad (4)$$

In this way, within the safety set, the logarithmic barrier function is positive, with no discontinuities; and the logarithmic barrier function is asymptotic near the boundary of the safety set, enforcing a soft constraint, allowing the system to approach the safety boundary without violating it.

In some cases, the above can be implemented as a quadratic program, where the control signal u is minimally modified to maintain safety, as follows:

$$u = \operatorname{argmin}_{\tilde{u}} \frac{1}{2} \|u - \tilde{u}\|_2 \quad (5)$$

$$\text{s.t.} \ \dot{\mathcal{B}} \leq \alpha\left(\frac{1}{\mathcal{B}(x)}\right) \quad (6)$$

If the reference control signal u respects the safety constraint, the system 50 maintains the control without any modifications. However, if the control signal violates safety, the formulation above ensures that the system 50 makes minimal adjustments to the control signal to sustain safety. The inequality in equation (6) ensures that the growth of B(x) is moderated, gradually restricting it as the CPS approaches the safety boundary.

Figure 2:
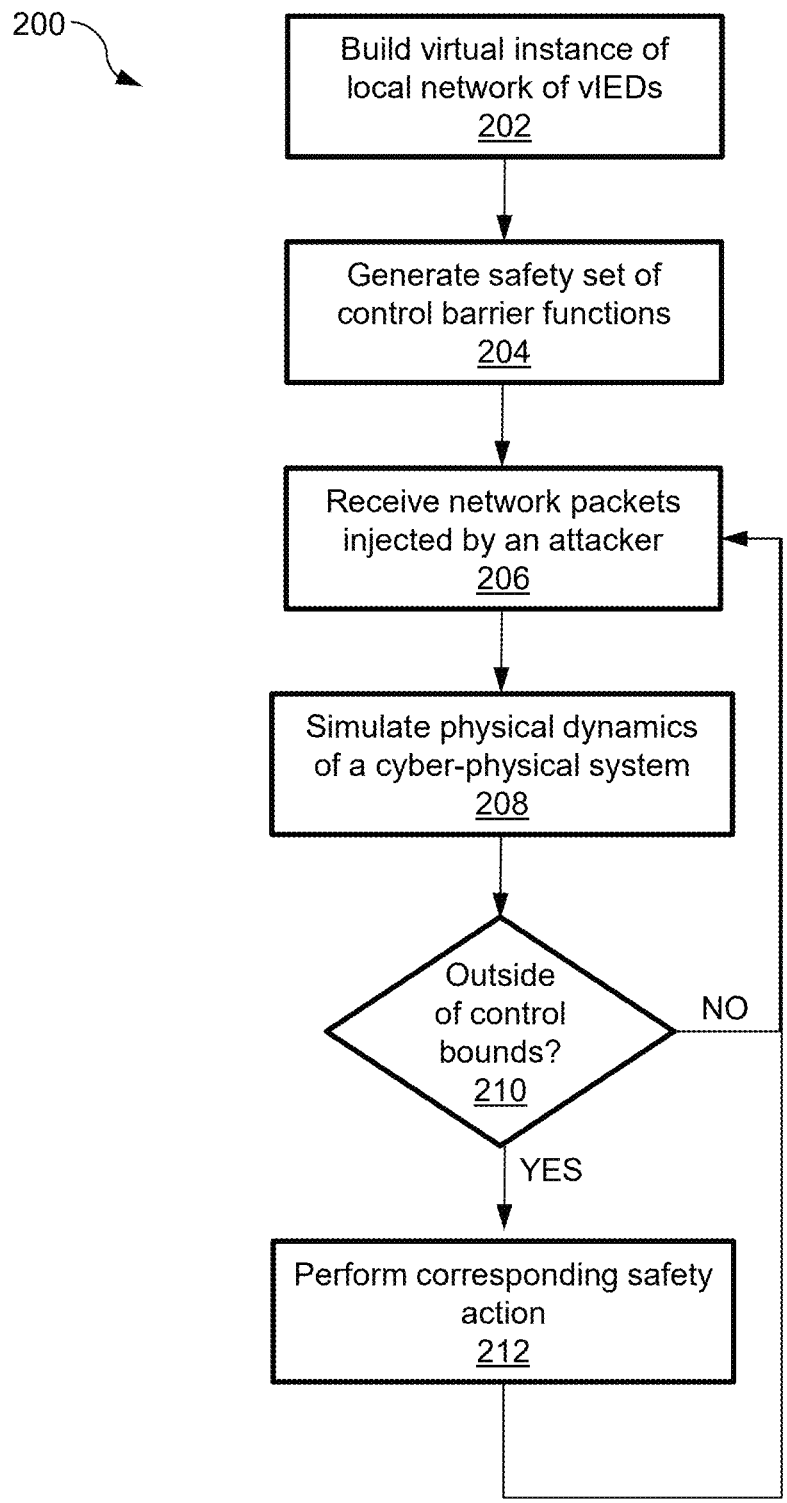
FIG. 2 is a flowchart of a method for physical layer modelling with a safety set in a cyber-physical system honeypot, in accordance with an embodiment.
Figure 3:
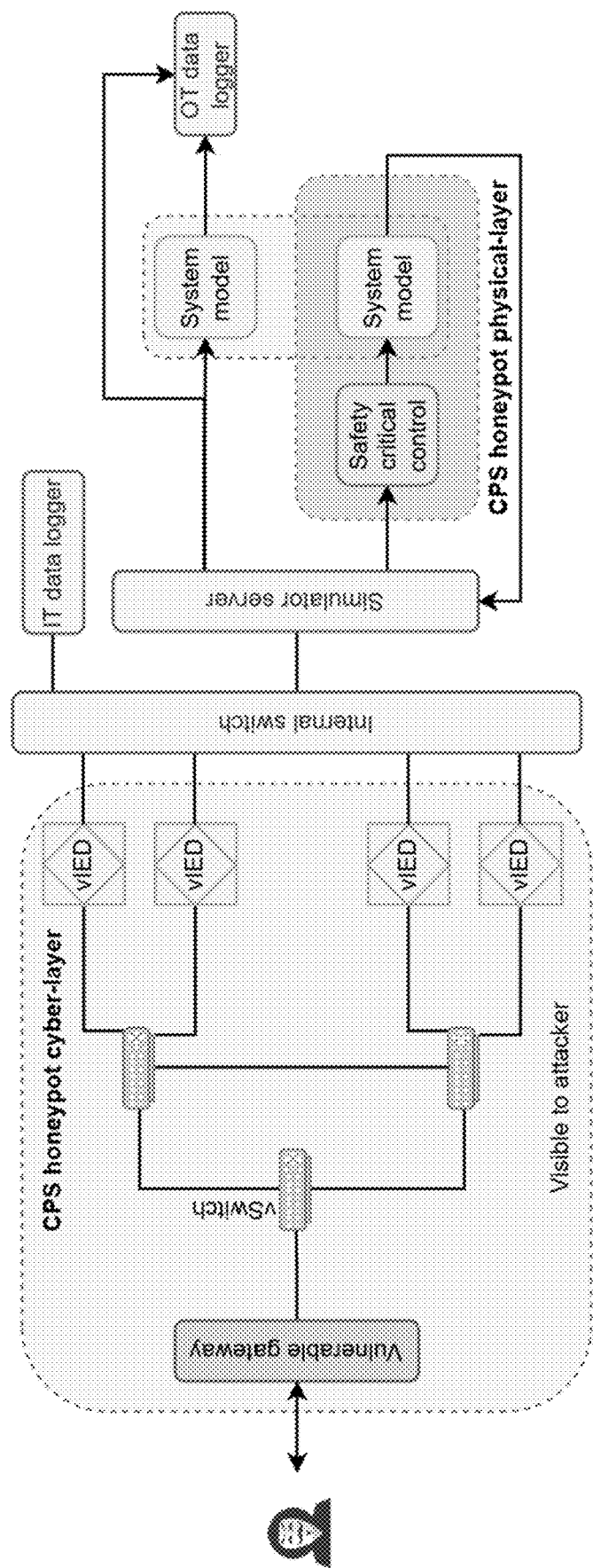
FIG. 3 illustrates an example of a cyber-physical system honeypot that implements the method of FIG. 2.

FIG. 2 illustrates a method 200 for physical layer modelling with a safety set in a cyber-physical system honeypot, in accordance with an embodiment. FIG. 3 illustrates an example of a CPS honeypot that implements the method 200; emulating both cyber and physical layers. In FIG. 3, the cyber layer is depicted only for illustrative purposes only. The cyber layer of the honeypot features a vulnerable gateway allowing unauthorized access to the cyber-physical system (e.g., a virtual power system facility). For example, the gateway may be equipped with a weakly configured virtual private network (VPN) interface, which attackers exploit to gain shell access.

At block 202, the device module 70 builds a virtual instance of a local network comprising intelligent electronic devices (IEDs); referred to as virtual Intelligent Electronic Devices (vIEDs). In an example, emulating the CPS's local network. In some cases, the local network can include physical IEDs in combination with the vIEDs. As part of the virtual instance, in an example, a state-space (i.e., model) can be formulated that represents a linear model of the operation of the CPS. In other examples, the virtual instance can be a simulation on a specialized software; such as Simulink™ or PSCAD™. An input vector to the model includes false command injections to a local control and the output vector includes measurements representative of the output of the CPS.

At block 204, the device module 70 generates a safety set based on a set of control barrier functions. The control barrier functions are determined by evaluating the operational settings that the CPS normally operates within and which exceeding would typically follow with the failure of the real CPS; and hence, it would raise suspicion of the cyberattacker if the honeypot simulates a CPS that operates outside these boundaries. For example, in a power system environment, deviations in the voltage or frequency that would trigger generation protection relays would typically be followed by cascading failure of the electric grid; which being a goal of cyberattackers, would flag the cyberattacker to cease the attack or would raise their suspicion of the honeypot. The device module 70 can perform the evaluation in control loops by determining whether the attacker-injected commands or actions can force the CPS to exit the safety set predetermined amount of time into the future.

At block 206, the simulation module 72 receives network packets injected to the vIEDs by the attacker.

At block 208, the simulation module 72, using the received attack-injected packets, simulates physical dynamics of the CPS in response to the attacker's actions.

The physical dynamics will generally depend on the nature of the environment within which the attacker interacts with the honeypot. For example, in an example of an electrical grid, the physical dynamics of the honeypot can include simulations of the frequency and voltage dynamics of a microgrid within a power generator. In this example, the attacker can inject commands to the control IEDs that regulate the spinning of the generator (hence, affecting the microgrid frequency), and the voltage at the power generator's connection with the microgrid (hence, affecting the microgrid voltage). In another example for an autonomous vehicle, the simulated physical dynamics can include vehicle dynamics, such as velocity and curving, and the physical dynamics of an environment (other cars and external objects) that can be represented by measurements captured by the autonomous vehicle's sensors. The sensor measurements can be made accessible to the attacker such that the attacker is given access to their readings.

At block 210, the control module 74 performs the control loops for each of the CPS settings, during the simulation, to determine whether each setting is predicted to potentially go outside of the corresponding bounds defined by the control barrier function. Where the settings are not predicted to go outside of the control bounds, the system 50 repeats block 206. In this way, the control module 74 determines whether the attacker-injected actions will potentially force the CPS outside the safety set at some time, t, into the future; and in doing so, can react accordingly to keep the CPS safely within the safety set.

At block 212, where the setting is determined to be outside of the corresponding bounds, the control module 74 performs a corresponding safety action to bring the CPS settings back into the bounds of the safety set. In most cases, the safety action is limited in time and/or scope in order to minimize actions. These minimized actions deceive the attacker into thinking their attacks are impacting the CPS and deceive the attacker to believe that they are allowed to eavesdrop on the CPS in order to strategize their next attack based on the response. In this way, after the safety action is performed and the setting are back within the control bounds, the system 50 can repeat block 206.

In an example of a water facility, the attacker's action can include injecting a bias to a pressure valve in the water facility to keep pouring water into a tank. The system 50 can modify this attack to reduce the injected bias value in order to let the water level rise up as expected by the attacker, but not so much as to cause overflow, flooding, or pressure damage. In another example of an electrical grid, the attacker's action can include injecting a false command to the voltage regulator of a generator in a microgrid. The safety action of the system 50 can modify that command to be within the bounds of the acceptable voltage for operation of the generator.

Alternatively, the modification determined by the system 50 can be performed on another control input of the CPS to maintain system integrity. For example, in the above water facility example, the safety action can minimally increase, or otherwise adjust, the outflow valve of the water tank. In this way, the attacker maintains their action of keeping water flowing in; however the water flows out by the safety action to keep the system safe.

The system 50 performs its actions at a physical layer model to moderate the attacker's actions. The system 50 does not assume prior knowledge of the attacker, but minimally modifies actions that would destabilize the CPS. This ensures the CPS remains stable in-simulation while still returning responses that a sophisticated attacker with knowledge of power system dynamics would anticipate. The modified response provided by the system 50 may appear as an existing defense that the attacker needs to bypass, prompting them to inject more aggressive or stealthy attacks or consider other attack strategies. By challenging the attacker, the system 50 can collect more data from their interaction with the honeypot. Meanwhile, the attacks are simulated on a detailed grid model to identify vulnerabilities in the system. IT and OT data from the attacker's actions are stored. The stored data can be used as appropriate; for example, to develop attack detection methods.

Advantageously, the system 50 minimally modifies the actions to keep the CPS within the bounds of the safety set. The minimal modification based on the optimization provided in Equation (5) provided herein. In an example, if the attacker injects a signal with value 1 that will force the system out of the safety set, and all values above 0.7 will likewise force the CPS outside of the safety set, then the system 50 can modify the attacker injected value to 0.7 to maintain the system integrity. Accordingly, the system 50 reacts to the injected signal in a way that is close enough to the expectations of the attacker, but likewise will not allow the CPS to fail.

The system's 50 minimal modifications of the actions can re-occur continuously throughout the interaction with the attacker. In this way, the system's 50 optimization finds the closest command to that injected by the attacker with which the CPS's integrity will be maintained. In some cases, where the attacker has determined how to make the CPS fail, the system 50 can log and/or record such attacking actions for later study, while modifying the actions to ensure the CPS is safe. In some cases, if the attacking actions are not predicted to force the CPS outside of the safety set, then the system 50 passively monitors the actions without modification.

Figures 4A, 4B, 4C, 4D, 4E:
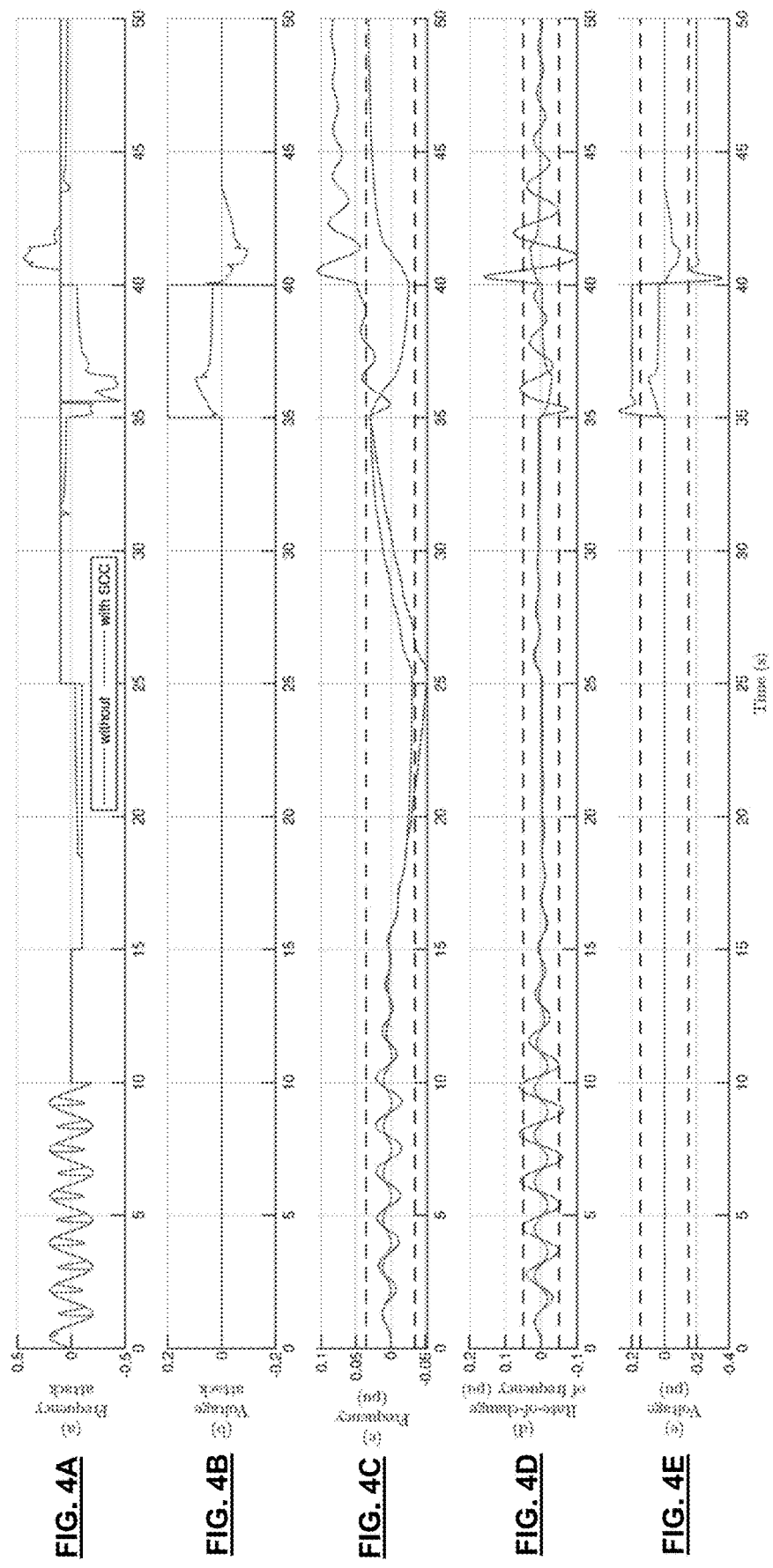
FIGS. 4A to 4E are charts that illustrate an example of an extended polymorphic attack on a honeypot of the embodiment of FIG. 1.

To illustrate the use of the system 50, FIGS. 4A to 4E are charts that illustrate an example of an extended polymorphic attack on the honeypot. FIGS. 4A and 4B depict an attacker who gains access to a CPS network of a generation facility and can inject false commands to the frequency (FIG. 4A) and voltage (FIG. 4B) controllers of a large generator while observing its terminal state, including the frequency (FIG. 4C) and its rate of change (FIG. 4D), as well as the terminal voltage (FIG. 4E).

In this example, the attacker's objective is to trip the generator by triggering any of its protective relays. The example considers under-frequency (UF), over-frequency (OF), rate-of-change of frequency (ROCOF), under-voltage (UV), and over-voltage (OV) protection. The curves in FIGS. 4A to 4E represent the impact of the attack without the SCC, while the red curves demonstrate the impact of incorporating the system 50. The dashed horizontal lines in FIGS. 4C to 4E represent relay settings. Exceeding these settings would trigger protection relays, fulfilling an attacker's goal of forcing generation out-of-service. Otherwise, the attacker may become suspicious of the honeypot. Hence, the system 50 maintains integrity by maintaining the CPS within these horizontal lines.

In this example, at time $t=0$ s, the attacker initiates an oscillatory attack on the frequency controller that would have triggered ROCOF protection. Next, at $t=15$ s, the attacker switches strategies and injects a high negative bias to the frequency controller to push the frequency below the UF relay setting. Then, at $t=25$ s, the attacker changes tactics again and injects a high positive bias to the frequency controller to raise the frequency above the OF relay setting. Failing in this attempt, at $t=35$ s, the attacker shifts focus and injects a high negative bias to the voltage controller to decrease the voltage below the UV relay setting. Finally, at $t=40$ s, the attacker injects a high positive bias to the voltage controller to increase the voltage above the OV relay setting. The bias attacks targeting the voltage controller would have also triggered ROCOF protection. Throughout these attacks, the system 50 intervenes to maintain the state within the bounds of the protection relays. This active control prevents the grid from becoming destabilized in the simulations, making it appear to the attacker that the attacks are not entirely effective and implying the presence of defense mechanisms that need to be bypassed. Consequently, the attacker is challenged to introduce more aggressive, sophisticated, or stealthy attacks, providing valuable data through their interaction with the honeypot implemented by the system 50.

In an example experiment, to evaluate the efficacy of the system 50 in resisting attacks, the present inventors used a reinforcement learning (RL) agent. The RL agent interacts with the physical process, generating attacks and refining them through learning; thereby mimicking intelligent attackers capable of learning from their interactions. The example experiments demonstrate empirically that the system 50 can resist attacks that previously succeeded in its absence and can endure further RL training without failure. Advantageously, the approach implemented by the system 50 is highly flexible, and can accommodate a wide range of physical processes and attack scenarios. In this example, a testbed is provided and control barrier functions characterizing the safety of the testbed are defined.

The system 50 uses both the simulated power system environment and the specific access (attack) points that the defender intends to monitor for cyberattack interactions with the physical process. For example, when simulating a power plant, attackers might be permitted to compromise input variables corresponding to the generation control setpoints, such as frequency and/or voltage regulators of the generator(s). Alternatively, if the system 50 simulates a substation or load aggregator, potential attack points could involve changing the system load. For the purposes of illustration, a power generation plant in a microgrid system will be considered.

In this example experiment, the system 50 operates on a synchronous generator, which serves as the master generator in a microgrid testbed. Microgrids are prime targets for cyberattacks due to their decentralized operations and heavy reliance on communication networks. Their potential critical role in powering essential infrastructures, such as hospitals, adds to their attractiveness for malicious attacks. Moreover, the low inertia of microgrids makes them vulnerable to cyber-physical attacks, making them ideal candidates for this example experiment.

Figure 5:
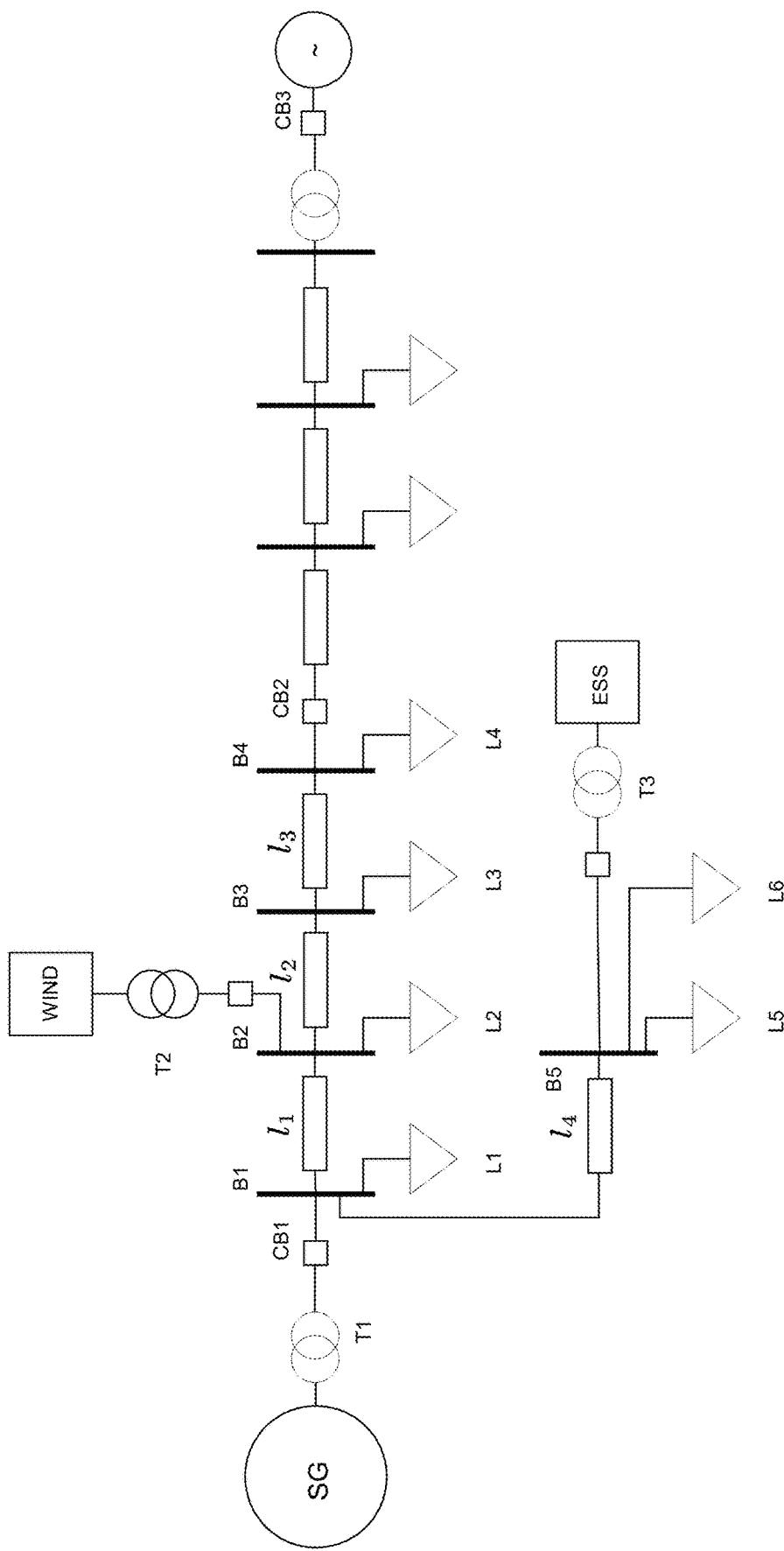
FIG. 5 is an example of a microgrid testbed for an example experiment consisting of two distributed generators.

In the example experiment, the microgrid testbed, as exemplified in the diagram of FIG. 5, consisted of two distributed generators: a 2 MVA type IV wind generator and a 2.5 MVA synchronous generator responsible for synchronization during transitions. Additionally, the microgrid incorporates a 125 kWh energy storage system (ESS). A GENROU model is used to simulate the synchronous generator. The wind generator and ESS are modeled with current sources. The microgrid circuit is represented using a dq-model.

In cases where cyberattackers cannot directly command the generator's circuit breaker to trip, representing the most straightforward, simple attack, it may be beneficial to understand and reveal alternative attack strategies that cyberattackers might follow to trip the generator. Tripping the generator will lead to a power imbalance within the microgrid, potentially resulting in a blackout. In a particular example, a cyberattacker can inject false commands into the voltage and frequency controllers of the synchronous generator while observing their impact on the generator's voltage and frequency. The system 50 can safeguard against these attacks causing deviations in the microgrid's frequency, rate-of-change of frequency, and terminal voltage that could trigger the generator's protection relays and trip the generator. The system 50 uses a linear model of the physical process. An input vector to the model comprises the attack points and an output vector comprises the data collected when there is a safety requirement.

A state-space is formulated that represents the linear model of the synchronous generator's operation within the microgrid. The input vector to the model includes false command injections to the generator's local control, denoted as $\omega_{inj}$ and $V_{inj}$. The output vector comprises measurements of frequency ($\omega$), rate-of-change of frequency (r), and terminal voltage (v). The state-space model is represented as follows:

$$\dot{x} = Ax + [b_v \ b_\omega] \begin{bmatrix} V_{inj} \\ \omega_{inj} \end{bmatrix} \quad (7)$$

$$y = \begin{bmatrix} v \\ \omega \\ r \end{bmatrix} = \begin{bmatrix} c_v \\ c_\omega \\ c_r \end{bmatrix} x = Cx \quad (8)$$

The objectives that the system 50 aims to prevent the attacker from attaining are formulated as a safety set. In the example of an electrical grid, the system 50 prevents the attacker from causing deviations in the voltage or frequency that would trigger generation protection relays; thus, the safety set S can be defined as follows:

$$S = \{y: \underline{V} \le v \le \overline{V}, \underline{W} \le \omega \le \overline{W}, |r| \le R\} \quad (9)$$

The symbols V, W, and R represent the protection settings for voltage, frequency, and ROCOF relays. The symbols' overlines and underlines are used to indicate over and under protection settings, respectively. The control barrier function(s) can then be formulated based on this safety set.

To simplify the expression for the control barrier functions, in some cases, $W=\min(\overline{W}-1, 1-\underline{W})$ pu and $V=\min(\overline{V}-1, 1-\underline{V})$ are determined as the frequency and voltage relay bounds, respectively, in the safety function. This simplifies equation (9) to:

$$S = \{y: |\Delta v| \le V, |\Delta \omega| \le W, |r| \le R\} \quad (10)$$

This symmetrical adjustment around the nominal values of frequency and voltage simplifies the expression for the control barrier functions.

An evaluation can be performed to determine whether the attacker-injected commands can force the CPS to exit the safety set $T_s$ seconds into the future. To compute the state $T_s$ seconds into the future with the current injected command, the state-space matrices in equation (7) are discretized:

$$A_d = e^{AT_s} \quad (11)$$

$$B_d = A^{-1}(A_d - I)B \quad (12)$$

Hence, the system's output $T_s$ seconds into the future is:

$$y_{t+T_s}(x) = C(A_d x + B_d u) \quad (13)$$

Subsequently, the following control barrier functions can be used to define the safety set:

$$h_v(x) = V^2 - \Delta v_{t+T_s}^2(x) \quad (14)$$

$$h_\omega(x) = W^2 - \Delta \omega_{t+T_s}^2(x) \quad (15)$$

$$h_r(x) = R^2 - r_{t+T_s}^2(x) \quad (16)$$

In the example experiments, while a single controller can be used to moderate both the injected commands to the frequency and voltage control loops, separate controllers were used for each loop. Where one control loop regulated the frequency at which the generator spins and the other control loop was for the voltage. In an example there was flexibility to choose different $T_s$ values for the state space discretization. Since the frequency dynamics are in the range of seconds, while the voltage dynamics are much faster, in the range of milliseconds, a more suitable discretization can be applied to each control loop considering its dynamics. Further, a longer $T_s$ for the frequency control loop allows running the optimization less frequently, consuming fewer computational resources. Further, each formulation can consider different constraints. Further, a simpler modular construction of the honeypot physical-layer can be used.

Figure 6:
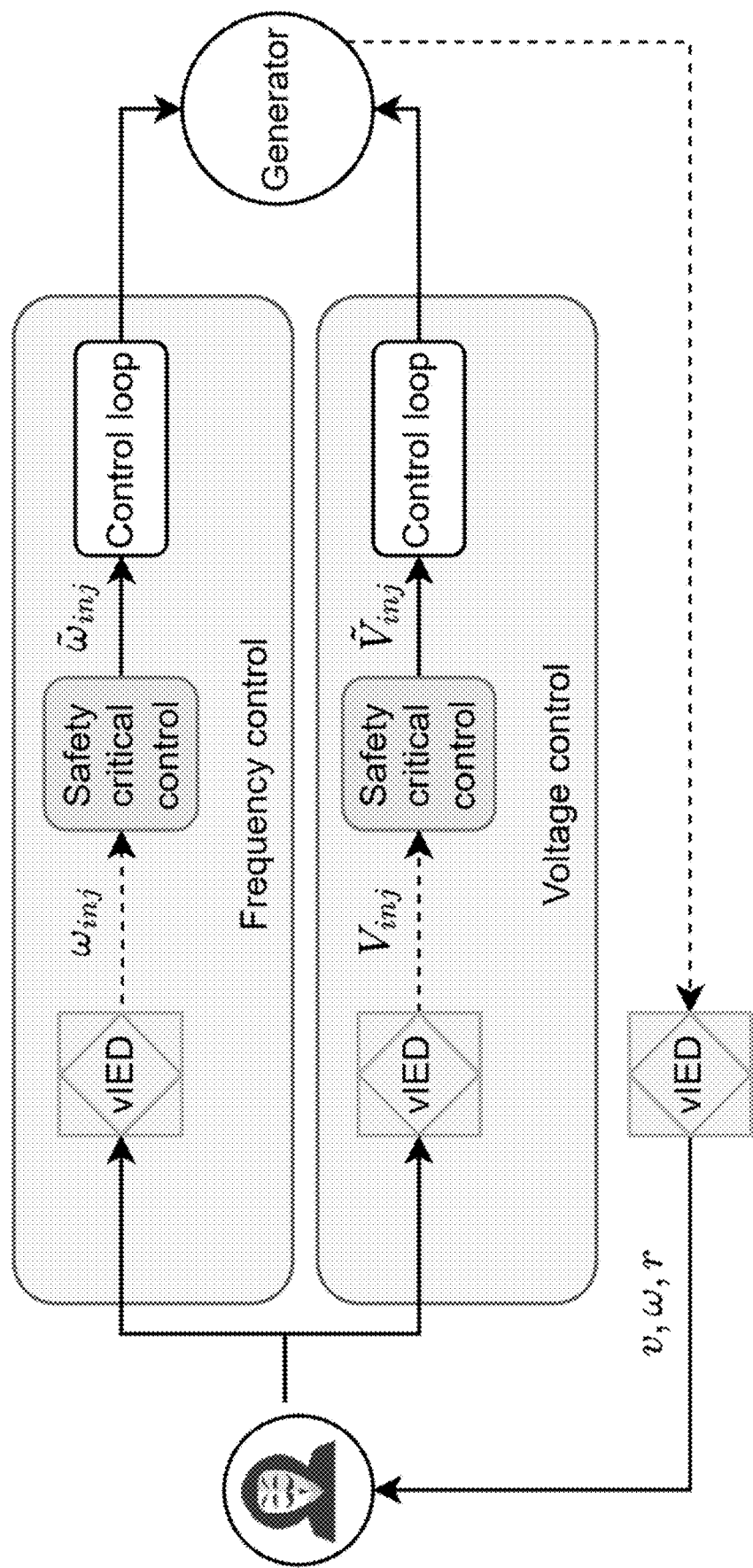
FIG. 6 illustrates an example experiment using separate controllers in each control loop.

By leveraging the above flexibility, the system 50 can tailor to the specific characteristics and requirements of each control loop, optimizing their performance. FIG. 6 illustrates the use of separate controllers in each control loop. The system 50 minimally modifies the attack-injected commands $V_{inj}$ and $\omega_{inj}$ to $\tilde{V}_{inj}$ and $\tilde{\omega}_{inj}$, respectively.

To implement the voltage control loop, a suitable $T_s$ is be selected (e.g., $T_s$=50 ms) and a quadratic program can be formulated with constraints that keep the voltage, the frequency, and the rate of change of frequency within their corresponding relay bounds:

$$\tilde{V}_{inj}^* = \arg_{\tilde{V}_{inj}} = \frac{1}{2}\|\tilde{V}_{inj} - V_{inj}\|_2 \quad (17)$$

$$\text{subject to} \quad \dot{\mathcal{B}}_v(x) - \frac{\alpha_1}{\mathcal{B}_v(x)} \leq 0$$

$$\dot{\mathcal{B}}_\omega(x) - \frac{\alpha_2}{\mathcal{B}_\omega(x)} \leq 0$$

$$\dot{\mathcal{B}}_r(x) - \frac{\alpha_3}{\mathcal{B}_r(x)} \leq 0$$

where, for $f \in \{v, \omega, r\}$, $$\dot{\mathcal{B}}_f(x) = \frac{d\mathcal{B}_f}{dx}\dot{x} \quad (18)$$

$$= -\frac{\frac{dh_f}{dx}}{h_f(x) + h_f^2(x)}(Ax + b_f \tilde{V}_{inj})$$

with $\frac{dh_f}{dx} = -2\Delta f_{t+T_s}(x)\frac{d}{dx}\Delta f_{t+T_s} \quad (19)$ $$= -2\Delta f_{t+T_s}(x)c_f A_d$$

For the frequency control loop, a longer $T_s$ can be selected (e.g., $T_s$=500 ms) and voltage deviations ca be ignored in the constraints since the frequency loop typically has a small effect on voltage due the faster dynamics of voltage regulation. The quadratic program can be formulated as follows:

$$\tilde{\omega}_{inj}^* = \underset{\tilde{\omega}_{inj}}{\arg\min} \quad \frac{1}{2}\|\tilde{\omega}_{inj} - \omega_{inj}\|_2 \quad (20)$$

$$\text{subject to} \quad \dot{\mathcal{B}}_\omega(x) - \frac{\alpha_4}{\mathcal{B}_\omega(x)} \leq 0$$

$$\dot{\mathcal{B}}_r(x) - \frac{\alpha_5}{\mathcal{B}_r(x)} \leq 0$$

where, for $f \in \{\omega, r\}$, $$\dot{\mathcal{B}}_f(x) = -\frac{\frac{dh_f}{dx}}{h_f(x) + h_f^2(x)}(Ax + b_f \tilde{\omega}_{inj}) \quad (21)$$

In the simulations of the example experiments, $\alpha_i$=2 was subjectively selected in all cases, however any suitable value can be used. Selecting lower values results in a stricter implementation that allows less deviations and vice-versa.

In the example experiments, RL was used to assess the effectiveness of the honeypot implemented by the system 50 against progressively improving attacks. The goal was to test the resilience to sophisticated attackers who learn and adapt their strategies through interaction with the honeypot over time.

Figure 7:
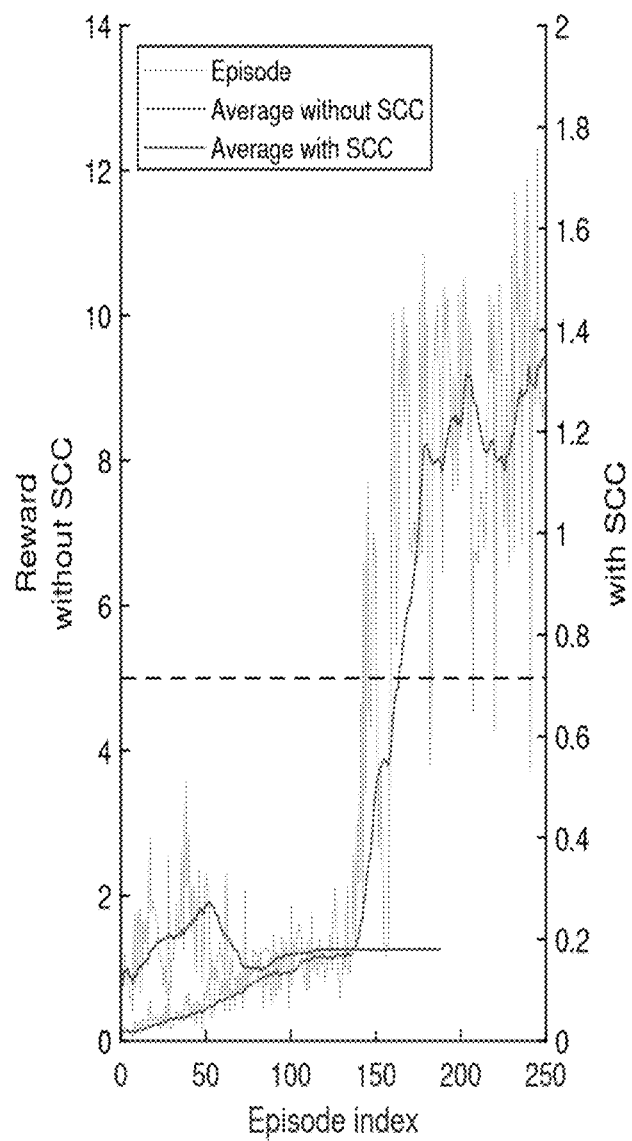
FIG. 7 is a chart showing a reinforcement learning ability to learn attack strategies to trip a generator, for an example experiment.

To demonstrate the RL agent's ability to learn attack strategies that trip the generator, the agent was initially trained on the model without the honeypot. The learning curve of the RL agent is shown in FIG. 7. Episodes with a reward exceeding the horizontal dashed line indicate successful tripping of the generator. FIG. 7 shows that the agent conceives many successful attacks and converges to a successful attack policy.

In an example, the RL agent can implement proximal policy optimization (PPO) using the following hyperparameters:

Sample time: 0.2 seconds
Experience horizon: 1024
Mini batch size: 128
Clip factor: 0.2
Entropy Loss Weight: 0.01
Advantage estimate method: Generalized advantage estimator (GAE)
GAE factor: 0.95
Discount factor: 0.95
Actor/critic learn rate: 0.008
Actor/critic gradient threshold: 1 (L2-norm)
Actor/critic optimizer: Adam Gradient decay factor: 0.9
Reward function:

$$R = 5\{y \notin \mathcal{S}\} + \left(\frac{\Delta v}{V}\right)^2 + \left(\frac{r}{R}\right)^2 \cdot \max\left(0, 1 - \left(\frac{\Delta \omega}{W}\right)^2\right)$$

Figure 10:
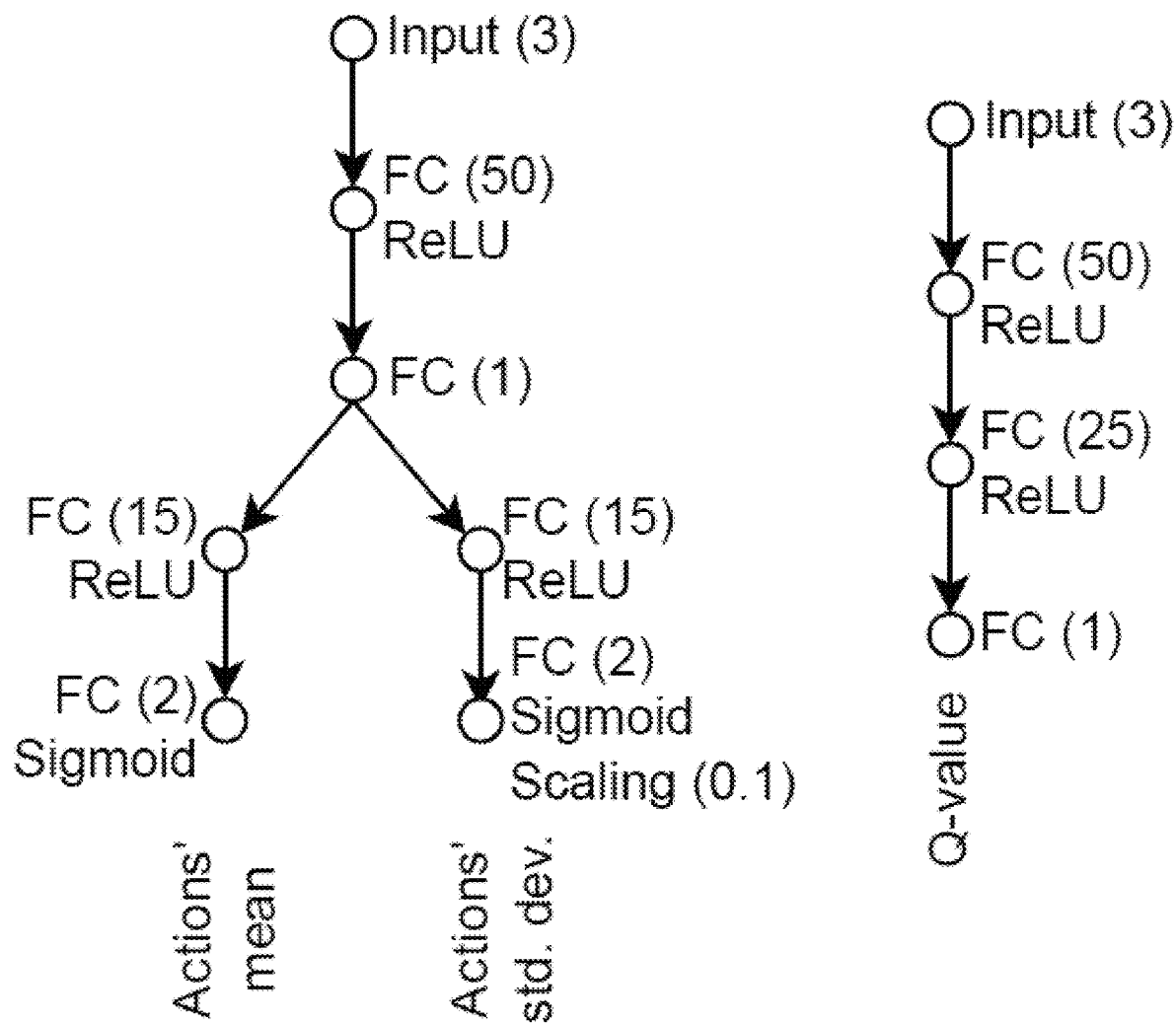
FIG. 10 illustrates actor (right) and critic (left) neural networks of the agent of the example experiments.

FIG. 10 illustrates actor (right) and critic (left) neural networks of the example PPO RL agent. The agent's actions are sampled from the distribution defined by the actor's mean and standard deviation branches and then scaled to the range of allowed attack values.

Figure 8:
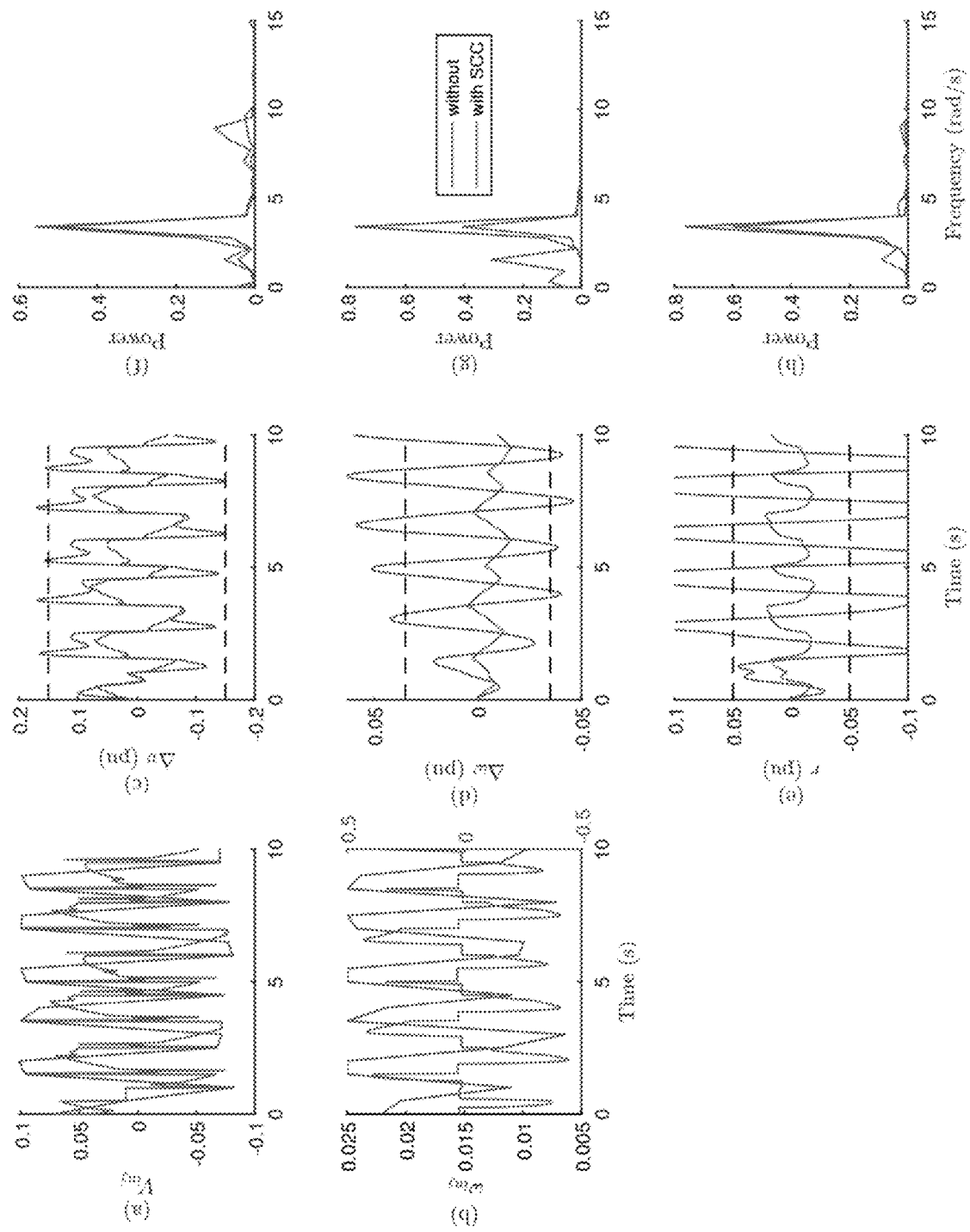
FIG. 8 illustrate charts showing the system of FIG. 1 preventing synthesized attacks for the example experiments.

The system 50 is able to resist all the synthesized attacks. FIG. 8 illustrates the system preventing one of the synthesized attacks. Charts (a) and (b) in FIG. 8 show the injected voltage and frequency commands, respectively, along with the system's 50 modifications to these commands. Charts (c) to (e) in FIG. 8 illustrate the impact of the system 50 on the CPS's states. Without the system 50, the states leave the safety set. However, with the system's 50 intervention, the states remain securely within the safety set.

The example experiments also trained the same agent on the model employed by the system 50. As depicted in FIG. 7, the agent can no longer generate attacks that trip the generator. The reward stays below the dashed line for all episodes, indicating that the system 50 maintains CPS integrity. Note that the learning curves terminate early as learning converges without ability to undermine the CPS. This conclusively demonstrates the resilience of the system 50 against such attacks.

Advantageously, the system 50 can only intervene when the attacker's actions are projected to force the CPS out of the safety set, minimally modifying the attacker's actions to maintain safety. The system 50 can permit the attacker to learn about the CPS by active-probing it with small actions during reconnaissance. Active probing can be used by attackers to identify vulnerable control devices and the impact of injecting attacks into them. Further, by applying identification techniques, attackers can learn about the CPS's dynamics and strategize their subsequent exploit to maximize its damage, stealthiness, and/or speed. During probing, the inactivity of the system 50 can enable attackers to obtain an accurate representation of the physical process. If the system 50 were to obscure the process, the attacker's learning would be distorted, and as a result, their strategies might not be applicable to the CPS. This would diminish the value of the honeypot in gathering data regarding attacker activity during reconnaissance.

Figure 9A:
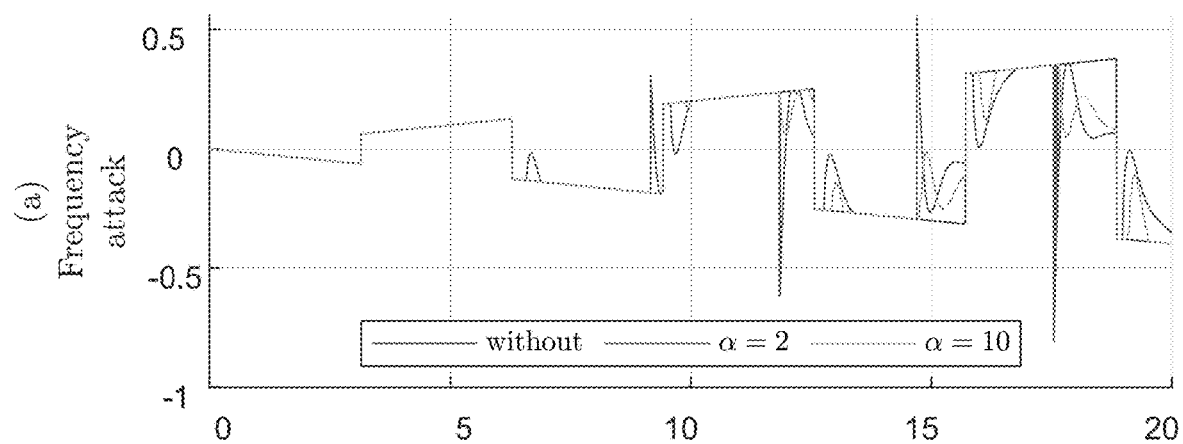
FIGS. 9A and 9B are charts showing inactivity of the system of FIG. 1 during probing and the effect of changing a for the example experiments.
Figure 9B:
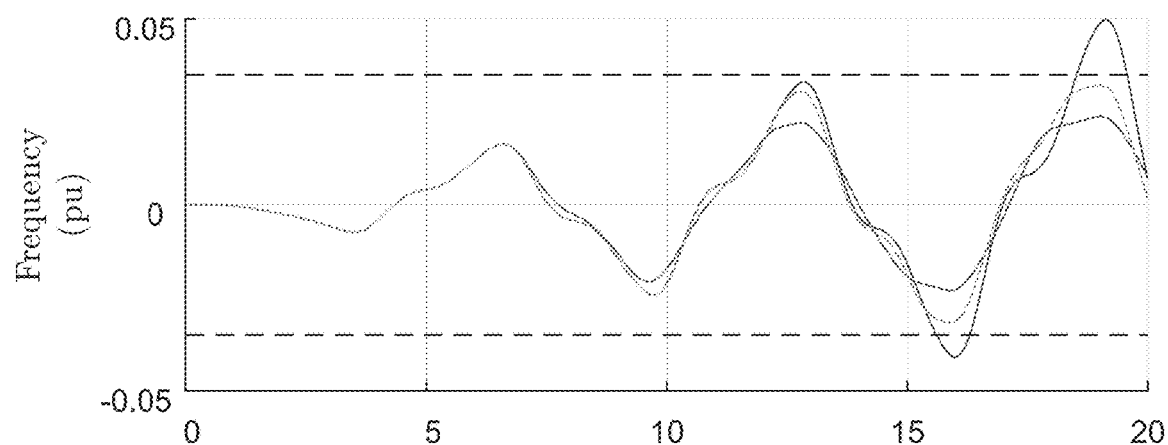

In FIGS. 9A and 9B, the inactivity of the system 50 during probing and the effect of changing a are illustrated. The system 50 does not moderate the small probing signal injected into the frequency control loop in the beginning of the attack, but intervenes to mitigate the structured aggressive attack that follows, keeping the frequency and its rate of change within the safety set. In FIG. 9B, also illustrated is the response with different values of a to show how the system 50 can be easily configured to yield a stricter or a more relaxed defense. The lower value of a=2 yields a system that maintains a wider gap to the boundary of the safety set.

An example application of adjusting the value of a is to entice cyberattackers to continue interacting with the honeypot by employing conditioned reinforcers. Studies in human behavior show that near misses, akin to the experiences of casino gamblers when they narrowly miss hitting the jackpot, increase the likelihood of prolonged engagement. Similarly, temporarily increasing the value of a will relax the system 50 to simulate a near miss to the attacker, persuading extended interaction with the honeypot.

The system 50 provides an advantageous approach over other approaches in the art. For example, other approaches to deceive attackers includes saturating measurements at their safe limits or implementing predefined defenses to counteract the injected attacks. Saturating observations generally causes abrupt changes in the data, which can reveal the honeypot. In contrast, moderating actions, as performed by the system 50, allows for smooth continuous observations. Further, for example, moderating actions to keep the voltage within the safety set not only affects the voltage measurement but also the frequency. Simply limiting one observation does not show corresponding effects on other observations, which can also help reveal the honeypot. Hence, moderating the attack, rather than the measurements, will advantageously appear to be defense mechanisms that the attacker will attempt to circumvent. Additionally, the system 50 provides comprehensive systematic protection across the entire CPS to previously unknown attacks with no predefined defenses.

To further evaluate the honeypot covertness, charts (f) to (h) in FIG. 8 illustrate the frequency spectrums and show the normalized frequency content of the CPS response to the attacks (charts (a) and (b) in FIG. 8) with and without the system's 50 application. The system 50 dampens the output signals without introducing significant frequency content that could raise suspicions and reveal the honeypot.

CPS honeypots offer a valuable approach to address cyber threats targeting electric grids. Acting at the physical layer, the system 50 moderates the interaction between cyberattackers and the CPS, concealing physical vulnerabilities and compelling attackers to devise increasingly sophisticated attack strategies. Data representing these interactions can be stored for analysis. By leveraging honeypots, the system 50 can effectively deceive attackers into revealing unknown physical vulnerabilities or weaknesses in grid defenses; enabling prompt rectification of the weaknesses. Additionally, honeypots facilitate cyberattacker profiling and understanding the stages and evolution of CPS attacks.

While the present disclosure generally describes application of the present embodiments to modelling of a physical layer for an electrical grid, it is understood that the present embodiments can be likewise applied to any suitable cyber-physical system; for example, a building control system, an air traffic control system, a medical device system, or the like.

But generally, the complexity of the solution requires computational tools and would not be possible without such tools.

Advantageously, the present embodiments interact with an attacker in real-time, thus permitting extensive computations to emulate the CPS in real-time. The present embodiments provide a solution that is high-dimensional and complex; whereby in some cases, the safety-critical control can be an optimization with thousands of iterations in order to determine a solution that minimally responds to the attack to maintain system integrity.

Although the invention has been described with reference to certain specific embodiments, various modifications thereof will be apparent to those skilled in the art without departing from the spirit and scope of the invention as outlined in the claims appended hereto.

The invention claimed is:

1. A method for modelling a cyber-physical system to act as a honeypot for cyberattacks, the method executed on one or more processing units in communication with a data storage, the method comprising:
building a virtual instance of the cyber-physical system comprising a physical layer and a cyber layer that controls the physical layer, the cyber layer comprising devices that comprise one or more of network devices, control units, sensors, and intelligent electronic devices, wherein the physical layer comprising a system model of the cyber-physical system, inputs to the system model comprising effects of the devices of the cyber layer on physical dynamics of the physical layer, and outputs of the system model comprising measurements of the physical dynamics received by the devices of the cyber layer;
generating a safety set defined by control barrier functions, the safety set delineates the bounds within which the cyber-physical system can operate safely;
receiving a cyberattack payload from an attacking device;
simulating the physical dynamics of the physical layer and operation of the cyber layer;
projecting whether the cyberattack payload can force the cyber-physical system to exit the safety set based on the simulated physical dynamics; and
performing a safety action on the cyber-physical system when the physical system is projected to exit the safety set due to the cyberattack payload.

2. The method of claim 1, wherein the attack payload is permitted to affect the cyber layer and alter the physical dynamics of the cyber-physical system while the cyber-physical system is projected to remain within the safety set.

3. The method of claim 1, wherein the safety action comprises a modification to the cyber-physical system that minimally modifies the cyber-physical system or the cyberattack payload to maintain that the cyber-physical system is projected to stay within the safety set.

4. The method of claim 3, wherein the safety action ceases when the attack payload is projected to not cause the cyber-physical system to exit the safety set.

5. The method of claim 1, wherein the intelligent electronic devices comprise virtual intelligent electronic devices.

6. The method of claim 1, wherein the intelligent electronic devices comprise a mix of the virtual intelligent electronic devices and physical intelligent electronic devices.

7. The method of claim 6, wherein determining whether the cyberattack payload is projected to force the cyber-physical system to exit the safety set comprises determining whether deviations in the measurements of the physical dynamics would trigger protective devices of the cyber-physical system.

8. A system for modelling a cyber-physical system to act as a honeypot for cyberattacks, the system comprising one or more processors in communication with a data storage, the data storage comprising instructions for the one or more processors to execute:

a device module to build a virtual instance of the cyber-physical system and to generate a safety set defined by control barrier functions, the safety set delineates the bounds within which the cyber-physical system can operate safely, the virtual instance comprising a physical layer and a cyber layer that controls the physical layer, the cyber layer comprising devices that comprise one or more of network devices, control units, sensors, and intelligent electronic devices, and the physical layer comprising a system model of the cyber-physical system, inputs to the system model comprising effects of the devices of the cyber layer devices on physical dynamics of the physical later, and outputs of the system model comprising measurements of the physical dynamics received by the devices of the cyber layer devices;

a simulation module to receive a cyberattack payload from an attacking device, and to simulate the physical dynamics of the physical layer and operation of the cyber layer; and a control module to project whether the cyberattack payload can force the cyber-physical system to exit the safety set based on the simulated physical dynamics, and to perform a safety action on the cyber-physical system when the physical system is projected to exit the safety set due to the cyberattack payload.

9. The system of claim 8, wherein the attack payload is permitted to affect the cyber layer and alter the physical dynamics of the cyber-physical system while the cyber-physical system is projected to remain within the safety set.

10. The system of claim 8, wherein the safety action comprises a modification to the cyber-physical system that minimally modifies the cyber-physical system or the cyber-attack payload to maintain that the cyber-physical system is projected to stay within the safety set.

11. The system of claim 10, wherein the safety action ceases when the attack payload is projected to not cause the cyber-physical system to exit the safety set.

12. The system of claim 8, wherein the intelligent electronic devices comprise virtual intelligent electronic devices.

13. The system of claim 8, wherein the intelligent electronic devices comprise a mix of the virtual intelligent electronic devices and physical intelligent electronic devices.

14. The system of claim 13, wherein determining whether the cyberattack payload is projected to force the cyber-physical system to exit the safety set comprises determining whether deviations in the measurements of the physical dynamics would trigger protective devices of the cyber-physical system.

* * * * *